Feb. 7, 1956     J. W. STANDARD     2,733,533
FISHHOOK GUARD
Filed Nov. 22, 1954

John W. Standard
INVENTOR.

United States Patent Office 2,733,533
Patented Feb. 7, 1956

2,733,533

FISHHOOK GUARD

John W. Standard, Sedalia, Mo., assignor of twenty-five per cent to Leo A. Hare, Lincoln, Mo.

Application November 22, 1954, Serial No. 470,319

2 Claims. (Cl. 43—27.4)

The present invention relates to new and useful improvements in guards for fishing hooks while the latter remain attached to a fishing line.

The primary object of the present invention is to provide a guard for hooks when attached to trot lines so that the line may be coiled and stored with the hooks attached thereto and without danger of the hooks becoming entangled when the line is again uncoiled and prepared for use.

An important object of the invention is to provide a guard which remains attached to the line and is slidable thereon into and out of position for receiving one of the fish hooks to firmly hold the point and barb of the fish hook in a protected position.

These together with other objects and advantages which will become subsequently apparent reside in the details of construction and operation as more fully hereinafter described and claimed, reference being had to the accompanying drawing forming a part hereof, wherein like numerals refer to like parts throughout, and in which:

Figures 1, 2, 3:
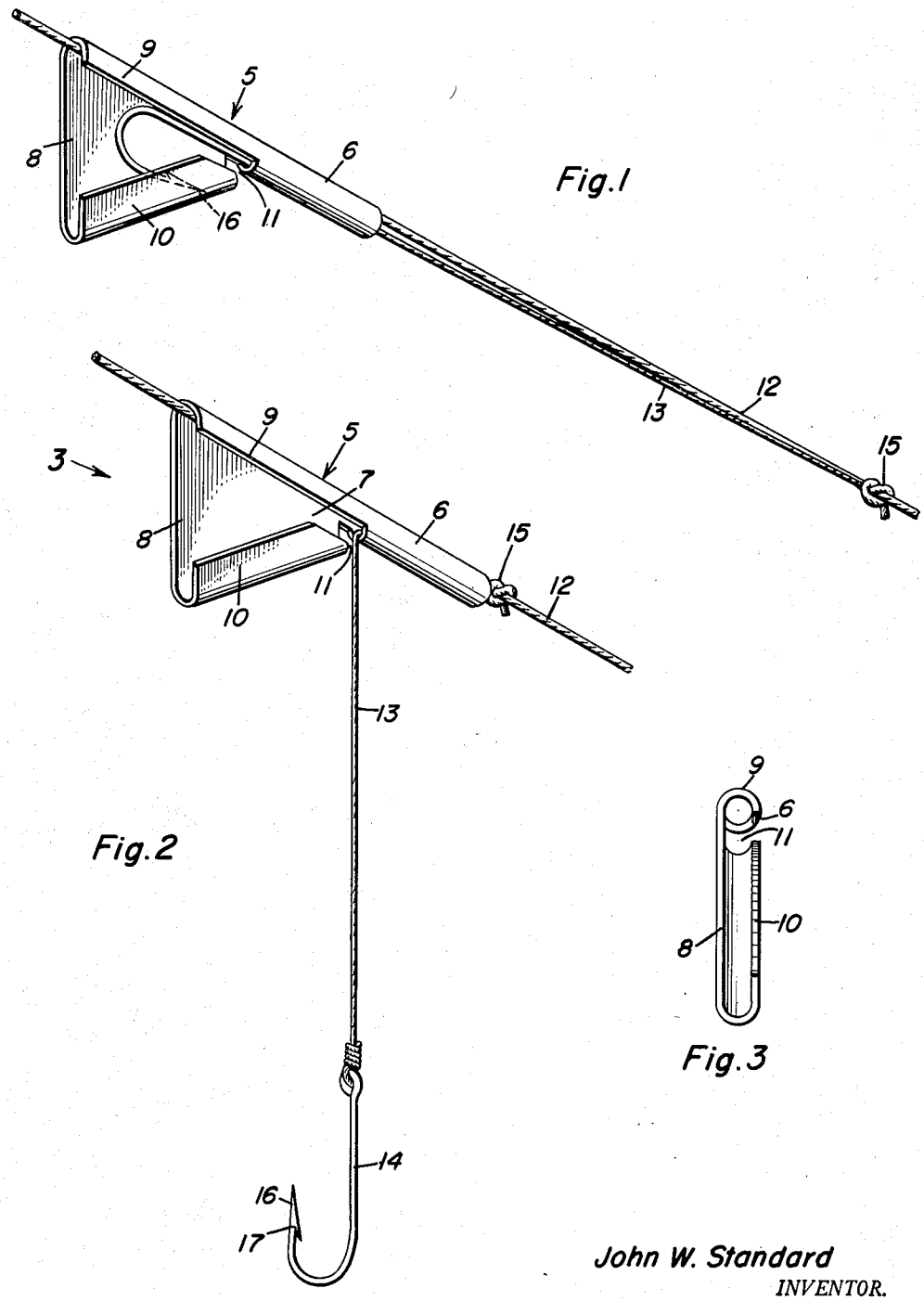
Figure 1 is a perspective view showing the fish hook held in protected position in the guard.
Figure 2 is a similar view showing the fish hook released from the guard.
Figure 3 is a rear end elevational view.

Referring now to the drawing in detail wherein for the purpose of illustration I have disclosed a preferred embodiment of the invention, the numeral 5 designates the fish hook guard generally and which may be constructed of metal, plastic or other suitable material, and which includes a tubular member 6 which projects outwardly at the apex portion 7 of a substantially triangular-shaped plate 8, and with the tube coplanar with the plate. The opposite side edges of the plate 8 are formed with opposed channel members 9 and 10 and with the channel member 9 positioned in longitudinal alignment with the rear end of the tube 6.

The rear end of the tube 6 is spaced from the adjacent end of the channel 10 to form a slot 11 therebetween.

The guard 5 is placed in use by sliding the tube 6 on a trot line or other type of fishing line 12 and the leader 13 of a fish hook 14 is inserted into the rear end of the tube 6 and attached to the line 12 forwardly of the tube by means of a knot or other suitable fastening means 15.

When the trot line or fishing line is in use the leader 13 extends through the slot 11 between the rear end of the tube 6 and the channel member 10, in the manner indicated in Figure 2 of the drawing. The channel member 9 aids in supporting the guard on the fishline 12.

When the fishing line is not in use and is ready to be coiled and dried, the leader 13 is placed in the channel member 10 and the tube 6 moved along the line away from the knot 15 and toward the hook 14 and the latter is turned into a position to engage the bill portion 16 and barb 17 of the hook in the channel 10 with portions of the hook disposed in wedging position in the channel members 9 and 10 and with the shank portion of the hook pulled forwardly in the tube 6, into the position shown in Figure 1 of the drawing.

The tube 6 is of sufficient length to receive a major portion of the shank of the hook so that the hook is firmly held therein and with the bill portion of the hook wedged in the channel member 10.

Since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A fish hook guard comprising a tubular member adapted to be slidably mounted on a fishing line and complemental leader, a plate member integrally formed with the tubular member, and diverging opposed channel members at the side edges of the plate member and adapted for receiving the fish hook in a protected position therein.

2. A fish hook guard comprising a substantially triangular shaped plate, a tubular member integrally formed with the plate at one corner of the latter and coplanar with the plate, said tubular member being adapted to be slidably mounted on a fishing line and attending leader, and opposed channels at the side edge portions of the plate and converging toward the tubular member, at least one of said channels being spaced from the rear end of the tubular member to provide a slot therebetween to receive the leader in a laterally extended position with respect to the tubular member when the fish hook is in use, and the bill portion of the stated fish hook being adapted to be wedgingly engaged in said channels in a protected position therein and with the shank portion of the fish hook pulled forwardly into the tubular member upon a predetermined sliding movement of the latter.

References Cited in the file of this patent

UNITED STATES PATENTS

| 786,352 | Forst | Apr. 4, 1905 |
| 2,655,758 | Warren | Oct. 20, 1953 |